(12) United States Patent
Yasuda et al.

(10) Patent No.: US 10,048,572 B2
(45) Date of Patent: Aug. 14, 2018

(54) CAMERA COVER

(71) Applicant: PANASONIC INTELLECTUAL PROPERTY MANAGEMENT CO., LTD., Osaka (JP)

(72) Inventors: Hideki Yasuda, Fukuoka (JP); Toyokazu Yoshino, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/340,317

(22) Filed: Nov. 1, 2016

(65) Prior Publication Data

US 2017/0139310 A1    May 18, 2017

(30) Foreign Application Priority Data

Nov. 12, 2015    (JP) .................... 2015-222232

(51) Int. Cl.
  *G03B 17/56*    (2006.01)
  *G02B 27/00*    (2006.01)
  *G03B 17/02*    (2006.01)

(52) U.S. Cl.
  CPC ....... *G03B 17/568* (2013.01); *G02B 27/0006* (2013.01); *G03B 17/02* (2013.01)

(58) Field of Classification Search
  None
  See application file for complete search history.

(56) References Cited

U.S. PATENT DOCUMENTS

2008/0112050 A1    5/2008  Nomura
2013/0136436 A1*   5/2013  Yoshino ............... G03B 17/08
                                                          396/25

FOREIGN PATENT DOCUMENTS

JP    2008-148276    6/2008

* cited by examiner

*Primary Examiner* — Jennifer D. Carruth
(74) *Attorney, Agent, or Firm* — Greenblum & Bernstein, P.L.C.

(57) ABSTRACT

A camera cover includes a cover outer surface which is a convex curved surface of which a lowermost part in a vertical direction is downwardly projected in the vertical direction; a first region which is provided at a predetermined radius around a substantially lowermost point of the convex curved surface; and a second region which is provided on the cover outer surface other than at the first region. The second region includes a first hydrophilic region having hydrophilic properties, and the first region has lower hydrophilic properties than those of the second region.

9 Claims, 14 Drawing Sheets

CAMERA COVER

BACKGROUND

1. Technical Field

The present disclosure relates to a camera cover.

2. Description of the Related Art

When a water droplet is adhered to a lens of a capturing device, refraction of light occurs due to the water droplet, which may cause the deterioration of a captured image. In the related art, in order to prevent a water droplet from being adhered to the lens, an optical unit described below has been proposed (refer to Japanese Patent Unexamined Publication No. 2008-148276). This optical unit causes a surface of a lens area to have water repellent properties, and causes a surface of a non-lens area, which is a holder formed around the lens area, to have hydrophilic properties. With this, in a case where a water droplet on the surface of the lens area comes in contact with the non-lens area, the optical unit guides the water droplet to the surface of the non-lens area having hydrophilic properties from the surface of the lens area having water repellent properties.

The optical unit disclosed in Japanese Patent Unexamined Publication No. 2008-148276 has difficulty in preventing the image quality of a captured image from being deteriorated due to a water droplet in a case where the capturing device captures an image in a vertically downward direction.

SUMMARY OF THE INVENTION

Summary

The present disclosure was made in consideration of the above described circumstance, and an object thereof is to provide a camera cover that can prevent the image quality of a captured image from being deteriorated caused by a water droplet even in a case where a capturing device captures an image in a vertically downward direction.

According to the present disclosure, there is provided a camera cover including a cover outer surface which is a convex curved surface of which a lowermost part in a vertical direction is downwardly projected in the vertical direction; a first region which is provided at a predetermined radius around a substantially lowermost point of the convex curved surface; and a second region which is provided on the cover outer surface other than at the first region. The second region includes a first hydrophilic region having hydrophilic properties. The first region has lower hydrophilic properties than those of the second region.

According to the present disclosure, it is possible to prevent the image quality of the captured image from being deteriorated caused by a water droplet even in the case where the capturing device captures an image in a vertically downward direction.

DETAILED DESCRIPTION

Hereinafter, the exemplary embodiments will be described in detail with reference to the accompanying drawings. Note that, detailed description more than necessary may be omitted. For example, the detailed description of already well-known matters and duplicate description for substantially the same structures will be omitted in some cases. This is in order to facilitate the understanding of those skilled in the art by preventing the description below from being unnecessarily redundant. Note that, the accompanying drawings and the following description are merely provided for those skilled in the art to sufficiently understand the present disclosure, and thus are not intended to limit the scope of claims.

Circumstances Leading to Obtaining Exemplary Embodiments of Present Disclosure

In a case where the optical unit disclosed in Japanese Patent Unexamined Publication No. 2008-148276 is applied to the monitoring camera covered by the dome cover, when the monitoring camera is adhered on a surface of a ceiling, a portion corresponding to the surface of the lens area becomes a lowermost part of the dome cover. In the dome cover, the adhered water droplets are gathered to the lowermost part by the gravity. Thus, it is difficult to guide the water droplets gathered to the lowermost part having the hydrophilic properties to the surface on the upstream side (corresponding to the surface of the non-lens area) having the water repellent properties, against the gravity. In addition, when the water droplet containing dirt is dried, the dirt remains on the lowermost part, which causes the deterioration of the image quality in a case where the directly lower side thereof is monitored.

Hereinafter, a camera cover that can prevent the image quality of a captured image from being deteriorated caused by a water droplet even in a case where a capturing device captures an image in a vertically downward direction will be described.

In the following exemplary embodiments, the camera cover will be described by exemplifying a dome cover.

First Exemplary Embodiment

Configurations

Figure 1:
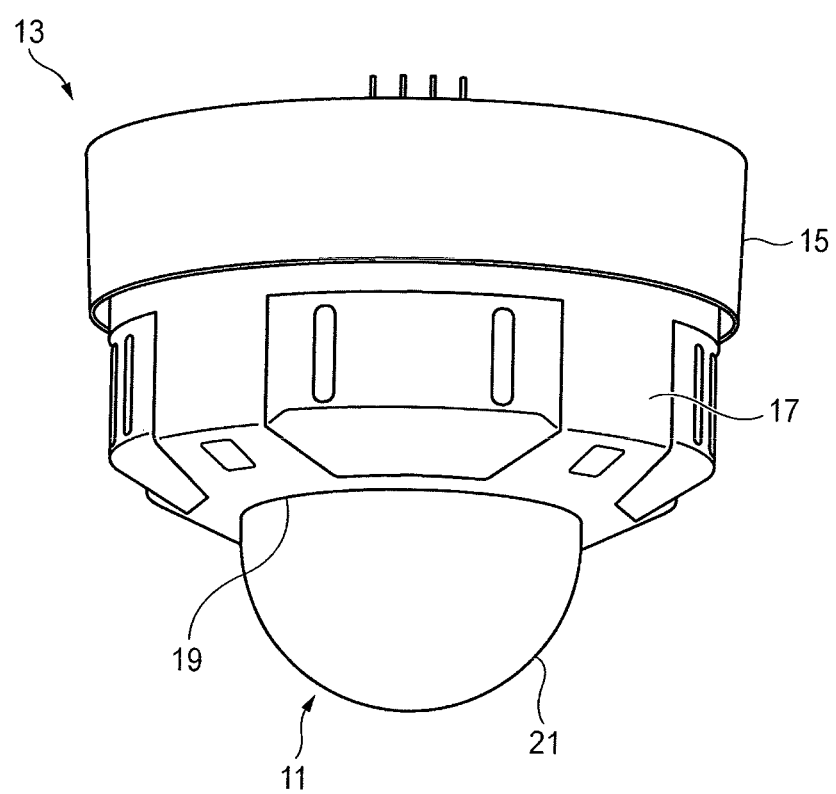
FIG. 1 is a perspective view illustrating a monitoring camera provided with a dome cover according to a first exemplary embodiment in a state of being installed on a ceiling.

FIG. 1 is a perspective view illustrating monitoring camera 13 provided with dome cover 11 according to a first exemplary embodiment in a state of being installed on a ceiling.

Dome cover 11 is used for, for example, monitoring camera 13. Monitoring camera 13 includes mounting stand 15. Mounting stand 15 is fixed onto a ceiling or a wall by using a mounting tool (not shown). Main body cover 17 is mounted on mounting stand 15. Main body cover 17 protects a camera or a control substrate which are not shown.

The camera is provided with a capture unit including an image sensor or a lens. The image sensor includes a charge coupled device (CCD) or a complementary metal oxide semiconductor (CMOS).

Dome cover mounting hole 19 is formed in main body cover 17. Hemisphere shell 21 of dome cover 11 is projected from dome cover mounting hole 19.

Figure 2:
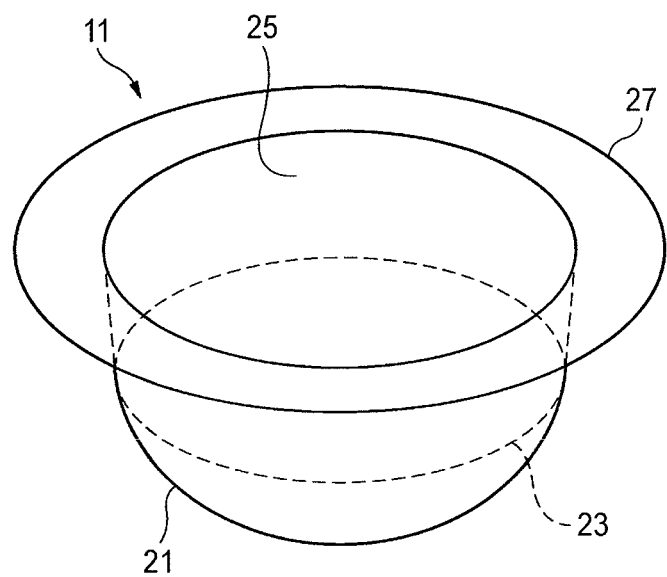
FIG. 2 is a perspective view of the dome cover illustrated in FIG. 1.

FIG. 2 is a perspective view of dome cover 11 illustrated in FIG. 1.

Dome cover 11 includes hemisphere shell 21, and cylinder 25 which is connected to opening peripheral edge 23 of hemisphere shell 21 at the same radius. Cylinder 25 includes flange 27 which is fixed to main body cover 17 on the side opposite to hemisphere shell 21.

Dome cover 11 is formed of a resin material which is excellent in moldability and transparency as a substrate material. Examples of the resin material include an organic resin material and an inorganic resin material. For example, the organic resin material such as polycarbonate is used as the substrate material of hemisphere shell 21. The polycarbonate is hard and strong in shock, and thus is preferably used. In addition, the resin material such as acryl excellent in transparency may be used.

Figure 3:
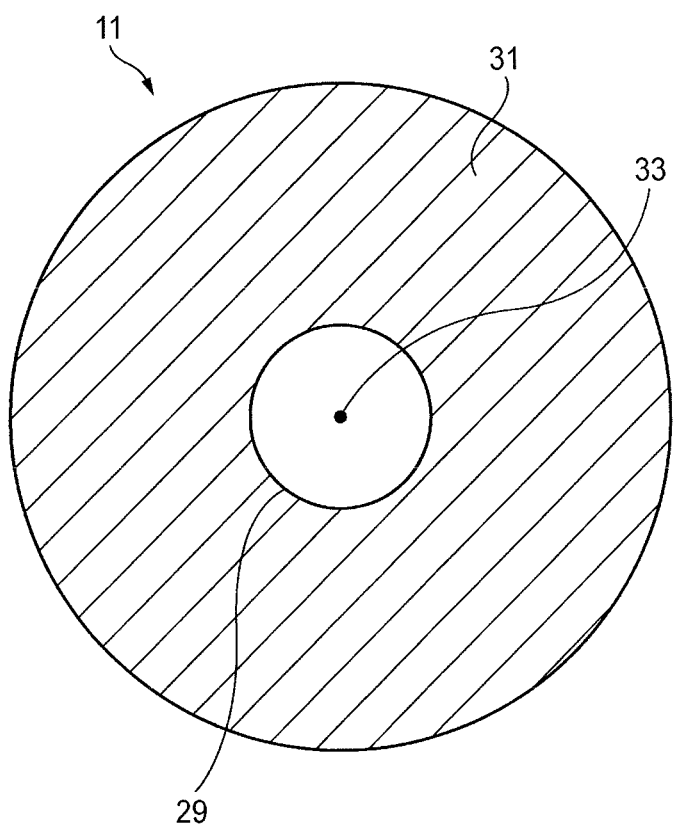
FIG. 3 is a bottom view of the dome cover illustrated in FIG. 2 as seen from below.

FIG. 3 is a bottom view of the dome cover 11 illustrated in FIG. 2 as seen from below.

Dome cover 11 includes a cover outer surface, water repellent 29, and hydrophilicity 31.

On the cover outer surface, the lowermost part in the vertical direction is downwardly projected in the vertical direction, and a convex curved surface is formed. That is, in dome cover 11, the cover outer surface corresponding to the convex curved surface is an outer surface of hemisphere shell 21.

Water repellent 29 is formed into, for example, a circle at a predetermined radius around lowermost point 33 (the lowermost point means not only the exact lowermost point but also the vicinity of the lowermost point. The same shall apply hereinafter.) of the convex curved surface. Water repellent 29 has the water repellent properties through, for example, a water repellent treatment or a surface treatment. The water repellent treatment is performed by using a well-known method. In the water repellent treatment, for example, water-repellent coating is performed by using a water repellent material containing a fluorine compound or a silicone compound. For example, the cover outer surface in the vicinity of the lowermost part of dome cover 11 is coated with the water repellent material. Note that, in a case where the substrate material of dome cover 11 is the water repellent material such as polycarbonate or acryl, water repellent 29 may be formed of the water repellent material of the substrate material as it is.

Hydrophilicity 31 is formed on the cover outer surface other than at water repellent 29. Hydrophilicity 31 has the hydrophilic properties through, for example, a hydrophilic treatment or a surface treatment. The hydrophilic treatment or the surface treatment is performed by using a well-known method. In the hydrophilic treatment, for example, hydrophilic coating is performed by using a hydrophilic material containing polyvinyl alcohol and polyacrylamide. For example, the cover outer surface (particularly, the cover outer surface other than the lowermost part) of dome cover 11 is coated with the hydrophilic material.

It is technically difficult to separately coat hydrophilicity 31 and water repellent 29, from the aspect of the securing of uniformity of the treatment and a boundary treatment. It is possible to easily and efficiently form hydrophilicity 31 and water repellent 29 with a two-stage process. First, the entire surface of dome cover 11 is subjected to the hydrophilic treatment through a spraying method or a dipping method, and then the water repellent material is transferred to the aforementioned entire surface through a tampon printing method.

In addition, in a case of using the water repellent properties of the substrate material, masking is performed on water repellent 29 in advance, then the hydrophilic treatment is performed thereon, and the masking is removed so as to expose the water repellent substrate material, and thereby hydrophilicity 31 and water repellent 29 can be formed.

Further, there is also a method of forming hydrophilicity 31 and water repellent 29 by performing the hydrophilic treatment on the entire surface of dome cover 11, and then removing the hydrophilic material by using an organic solvent so as to expose the water repellent substrate material.

The water adhered to hydrophilicity 31 is difficult to form a ball shape and thinly spread on hydrophilicity 31 so as to form a water film. That is, a water droplet W adhered on the cover outer surface provided with hydrophilicity 31 becomes a water film by uniformly spreading on the hydrophilic coating without being formed into the ball shape through the hydrophilic treatment. With this, light is incident on the camera without being substantially refracted, and thus it is possible to preferably maintain the image visibility.

The water adhered to water repellent 29 is likely to be formed into the ball shape and is likely to drop downwardly in the vertical direction by the gravity.

The water adhered to water repellent 29 or hydrophilicity 31 includes rain, snow, water droplets due to dew condensation, and water which is intentionally adhered from the outside.

A contact angle of water in water repellent 29 is greater than a contact angle of water in hydrophilicity 31. The contact angle is determined by the material of the cover outer surface. For example, in a case where the contact angle is equal to or lower than 40 degrees, the cover outer surface has the hydrophilic properties, and in a case where the contact angle is equal to or lower than 100 degrees, the cover outer surface has the water repellent properties. For example, the contact angle of water in water repellent 29 can be changed through the water repellent treatment. For example, the contact angle of water in hydrophilicity 31 can be changed through the hydrophilic treatment.

Figure 4:
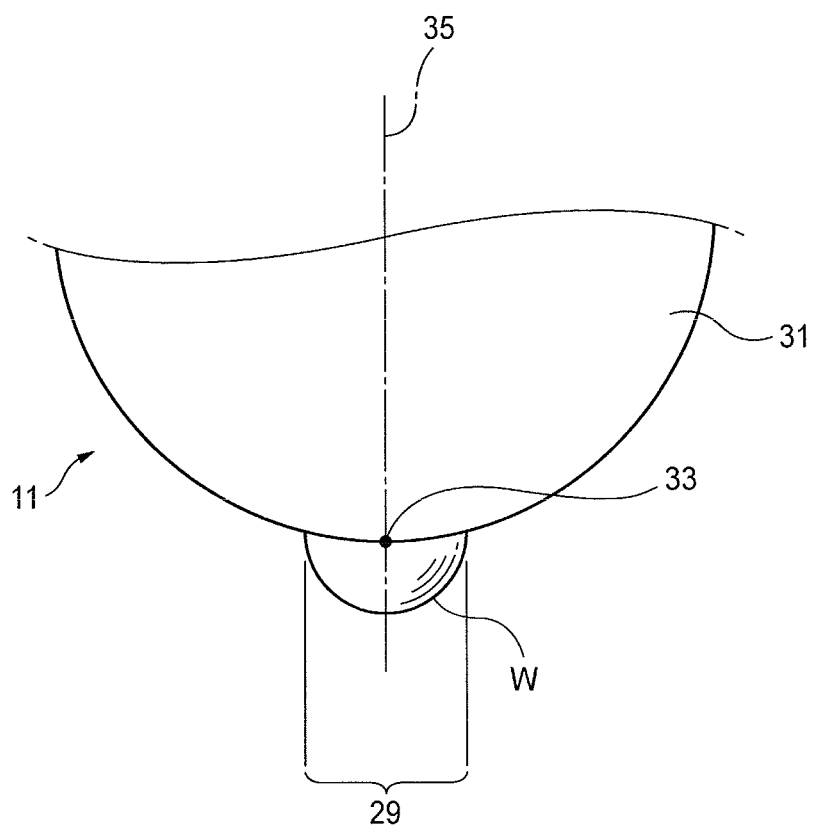
FIG. 4 is a side view of the dome cover illustrated in FIG. 1, to which a water droplet is adhered.
Figure 5:
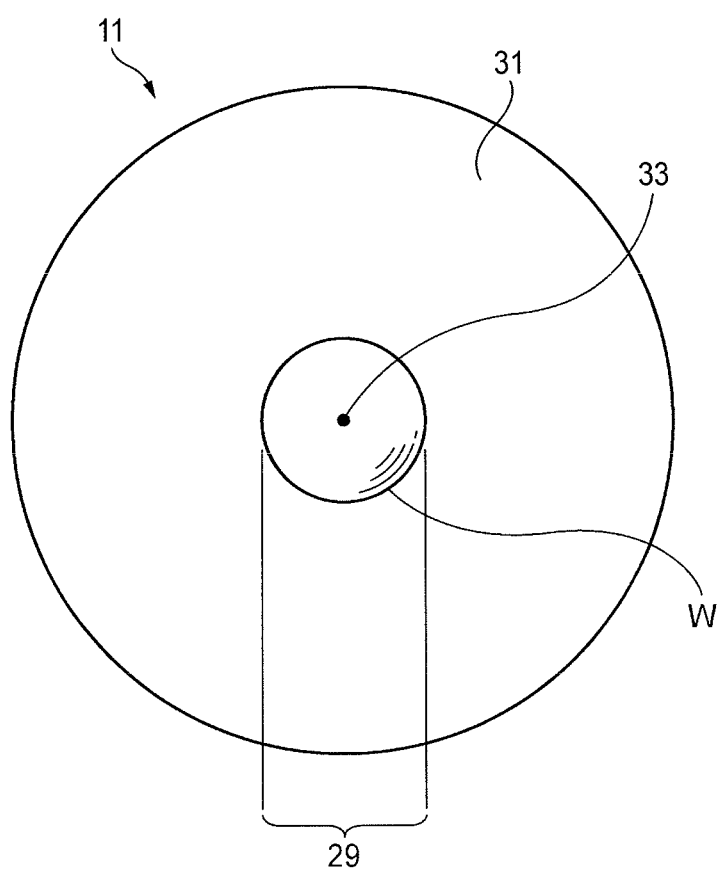
FIG. 5 is a bottom view of the dome cover illustrated in FIG. 1, to which the water droplet is adhered, as seen from below.

FIG. 4 is a side view of dome cover 11 illustrated in FIG. 1, to which the water droplet W is adhered. FIG. 5 is a bottom view of dome cover 11 illustrated in FIG. 1, to which water droplet W is adhered, as seen from below.

In dome cover 11, water repellent 29 is provided, on the convex curved surface of the lowermost part, with a predetermined radius around lowermost point 33. Hydrophilicity 31 is provided on the cover outer surface other than water repellent 29.

The water adhered to hydrophilicity 31 other than the lowermost part is directed to the lowermost part by gravity, and flows down along the cover outer surface. The flowing down water reaches a boundary between hydrophilicity 31 and water repellent 29. In the aforementioned boundary, the contact angle of water in water repellent 29 is greater than the contact angle of water in hydrophilicity 31, and thus resistance is caused when the water moves into water repellent 29.

Here, a force (a moving force) for moving the water along the cover outer surface is caused by gravity. In the convex curved surface, the moving force is changed depending on a distance from lowermost point 33, and becomes zero at lowermost point 33. That is, the movement of the water is stopped at a position of lowermost point 33 through which vertical line 35 illustrated in FIG. 4 passes. The water tends to be stationed at this position.

The boundary between hydrophilicity 31 and water repellent 29 is set to be a position at a predetermined distance from lowermost point 33. This position is set to be a position where the moving force (cross-border force) which is greater than the resistance force of water repellent 29 is caused in water.

Accordingly, the water flows down to lowermost point 33 of water repellent 29 extending beyond the boundary between hydrophilicity 31 and water repellent 29. In lowermost point 33, the gravity acts with respect to water in a maximum manner in the direction (peeling direction) of being separated from the cover outer surface. Further, the contact angle of water in water repellent 29 is greater than the contact angle of water in hydrophilicity 31, and an area where water comes in contact with the cover outer surface in water repellent 29 is smaller than that in hydrophilicity 31. With this, the water which reaches lowermost point 33 illustrated in FIGS. 4 and 5 is difficult to support its own weight in water repellent 29 as compared with water on other cover outer surfaces, and thus is likely to drop down.

Accordingly, dome cover 11 of monitoring camera 13 can prevent a monitoring image from being deteriorated caused by the adhesion of water droplet W to the lowermost part. Thus, in a case where monitoring camera 13 is installed on the ceiling, dome cover 11 can prevent the monitoring image on the right below (in a vertically downward direction) from being deteriorated, thereby improving the monitoring accuracy.

Effects

As described above, dome cover 11 includes cover outer surface, water repellent 29, and hydrophilicity 31. Water repellent 29 has lower hydrophilic properties than those of hydrophilicity 31 and includes a water repellent region having the water repellent properties. Water repellent 29 is an example of a first region which has the lower hydrophilic properties than those of hydrophilicity 31. Hydrophilicity 31 is an example of a first hydrophilic region having the hydrophilic properties, and is an example of a second region including the first hydrophilic region.

According to dome cover 11, the water adhered to hydrophilicity 31 or water repellent 29 flows down in a vertically downward direction and becomes the water droplet in water repellent 29 such that water droplet is peeled from the cover outer surface, and thus is likely to drop down. Accordingly, it is difficult to maintain a state where the water droplet is adhered to the lowermost part of the cover outer surface. With this, dome cover 11 can prevent the image quality from being deteriorated caused by refraction of light due to the water droplet in dome cover 11. Further, dome cover 11 can prevent the image quality from being deteriorated caused by the water droplet being reflected on the captured image when the water droplet formed into the ball shape is accumulated on the outer surface of dome cover 11.

The amount of water remaining in the lowermost part of the cover outer surface is reduced by dome cover 11. Thus, dome cover 11 can reduce the residual amount of dirt when water is dried and thus can prevent dirt from being generated in the lowermost part. Accordingly, dome cover 11 can prevent the deterioration of the image quality of the captured image when the direction (in a vertically downward direction) of the lowermost part is captured.

In addition, in a case where the camera cover is dome cover 11, hemisphere shell 21 includes the convex curved surface, and thus it is difficult to provide a wiper for wiping water. Even in this case, the water droplet which is moved to lowermost point 33 of water repellent 29 by using gravity is peeled from the cover outer surface, and thus it is possible to reduce the influence of the water droplet.

Second Exemplary Embodiment

Figure 6:
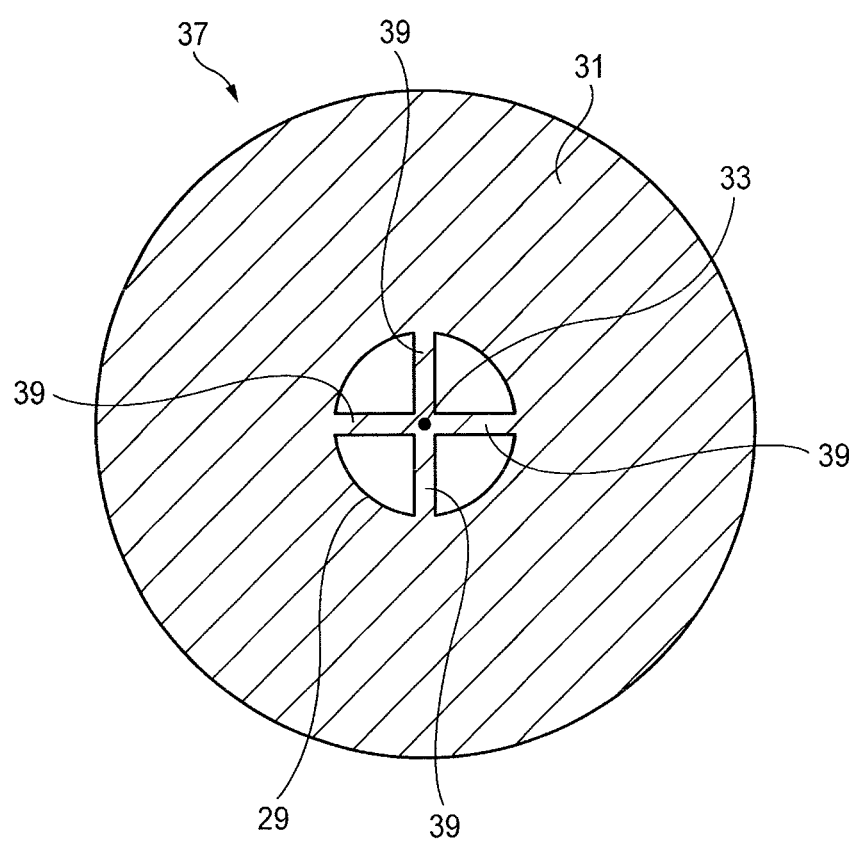
FIG. 6 is a bottom view of a dome cover according to a second exemplary embodiment as seen from below.

FIG. 6 is a bottom view of dome cover 37 according to a second exemplary embodiment as seen from below. Note that, in the second exemplary embodiment, the description for the same matters as those in the first exemplary embodiment will be omitted or will be simplified.

Dome cover 37 includes at least one hydrophilicity guide path 39 leading to lowermost point 33 from hydrophilicity 31, in water repellent 29. Hydrophilicity guide path 39 is linearly formed, for example. Hydrophilicity guide path 39 has the hydrophilic properties. Accordingly, in hydrophilicity guide path 39, the contact angle of water is smaller than the contact angle of water repellent 29. Note that, the contact angle of water in hydrophilicity guide path 39 may be different from the contact angle of water in hydrophilicity 31.

In dome cover 37, a plurality of hydrophilicity guide paths 39 may be radially provided around lowermost point 33. In FIG. 6, four hydrophilicity guide paths 39 are provided. The number of hydrophilicity guide paths 39 is merely an example, and may be changed to other number. In addition, hydrophilicity guide path 39 may be formed or not formed in the circumferential direction so as to surround lowermost point 33 at regular intervals. Hydrophilicity guide path 39 may include a curved part.

As such, water repellent 29 may include a water repellent region, hydrophilicity guide path 39 leading to the lowermost point from hydrophilicity 31. Hydrophilicity guide path 39 has higher hydrophilic properties than those of the water repellent region. The hydrophilic guide path is an example of a guide path.

Although water receives flow resistance from water repellent 29 when reaching the boundary between hydrophilicity 31 and water repellent 29, the water comes in contact with hydrophilicity guide path 39, and thus the flow resistance becomes smaller. With this, it is likely that the moving force of water by gravity becomes excellent, and flows down to water repellent 29 by extending beyond the boundary. In other words, it is less likely that the flowing down water is accumulated along the boundary.

In circular-shaped water repellent 29 of dome cover 37, the contact water from any direction of 360 degrees is likely to come in contact with hydrophilicity guide path 39. With this, water is likely to flow down to the lowermost point 33 where the dropping down of the water is prompted.

When a plurality of hydrophilicity guide paths 39 are radially provided around the lowermost point, water is likely to move to lowermost point 33. Thus, in lowermost point 33, a force acting to the peeling direction from the cover outer surface by gravity is increased, and thus water is likely to drop down.

Third Exemplary Embodiment

Figure 7:
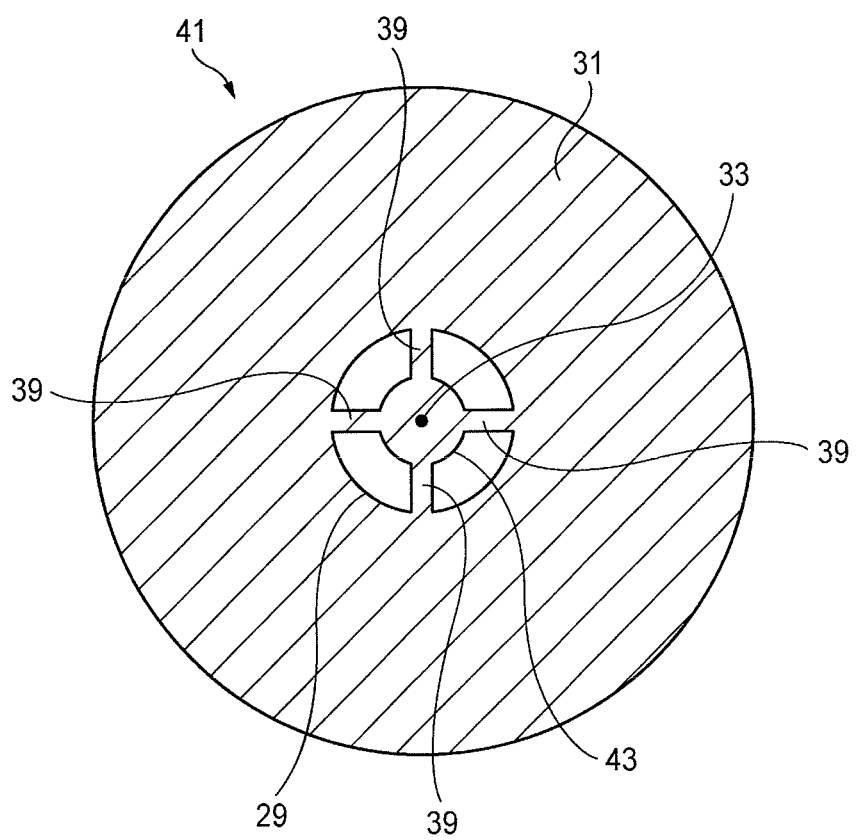
FIG. 7 is a bottom view of a dome cover according to a third exemplary embodiment as seen from below.

FIG. 7 is a bottom view of dome cover 41 according to a third exemplary embodiment as seen from below. Note that, in the third exemplary embodiment, the description for the same matters as those in the first and second exemplary embodiments will be omitted or will be simplified.

In the lowermost part of dome cover 41, hydrophilic circle 43 having a radius which is shorter than the radius of water repellent 29 around lowermost point 33 is provided in water repellent 29 in a state of being in concentric circle (the concentric circle means not only the exact concentric circle, but also substantially concentric circle. The same shall apply hereinafter). Hydrophilic circle 43 has the hydrophilic properties. Accordingly, in hydrophilic circle 43, the contact angle of water is smaller than the contact angle of water repellent 29. Note that, the contact angle of water in hydrophilic circle 43 may be different from the contact angle of water in hydrophilicity guide path 39 or the contact angle of water in hydrophilicity 31. Hydrophilic circle 43 is an example of a second hydrophilic region.

According to dome cover 41, when hydrophilic circle 43 is provided at the center of water repellent 29, water is likely to move lowermost point 33 at which the gravity in the peeling direction is the maximum as compared with a case where hydrophilic circle 43 is not provided. Thus, as compared with the case hydrophilic circle 43 is not provided, a large water droplet is formed, and a force acting to the peeling direction from the cover outer surface by gravity is increased, and thus water accumulated at lowermost point 33 is likely to drop down.

Fourth Exemplary Embodiment

Figure 8:
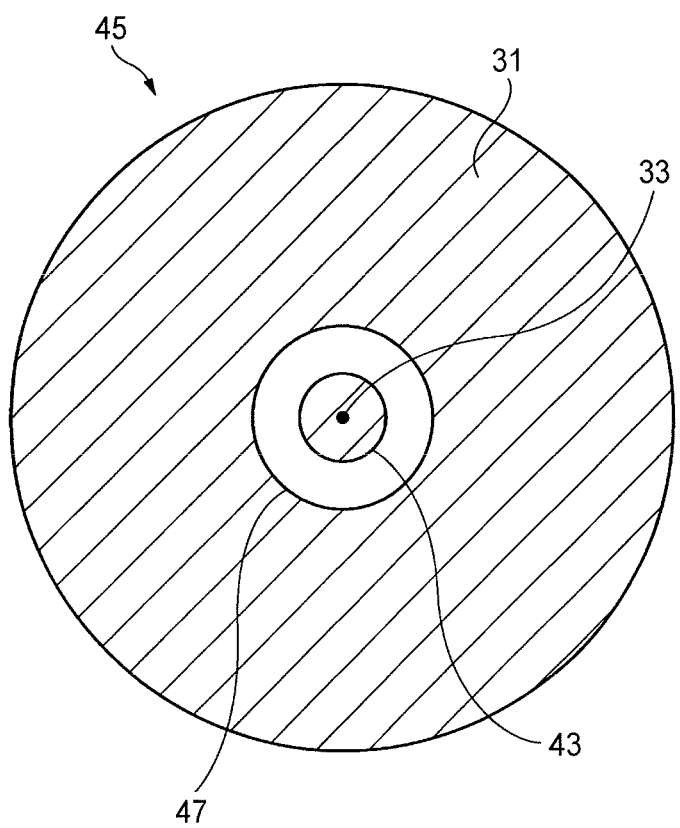
FIG. 8 is a bottom view of a dome cover according to a fourth exemplary embodiment as seen from below.

FIG. 8 is a bottom view of dome cover 45 according to a fourth exemplary embodiment as seen from below. Note that, in the fourth exemplary embodiment, the description for the same matters as those in the first to third exemplary embodiments will be omitted or will be simplified.

In the lowermost part of dome cover 45, hydrophilic circle 43 and medium hydrophilicity 47 are provided on the same region as that of water repellent 29.

Hydrophilic circle 43 is provided at a predetermined radius around lowermost point 33. Hydrophilicity guide path 39 is not connected to hydrophilic circle 43. On the outer periphery of hydrophilic circle 43, medium hydrophilicity 47 is provided in an annular shape, for example. Medium hydrophilicity 47 comes in contact with hydrophilic circle 43 in the inside thereof so as to surround hydrophilic circle 43. Further, medium hydrophilicity 47 comes in contact with hydrophilicity 31 in the outside thereof so as to be surrounded by hydrophilicity 31. Hydrophilic circle 43 is an example of a third hydrophilic region. Medium hydrophilicity 47 is an example of a fourth hydrophilic region.

Here, the contact angle of water in hydrophilicity 31 becomes contact angle θ1. The contact angle of water in hydrophilicity 47 becomes contact angle θ2. The contact angle of water in hydrophilic circle 43 becomes contact angle θ3. Note that, a relation expressed by contact angle θ1<contact angle θ2, contact angle θ3<contact angle θ2 is established. Contact angle θ1 and contact angle θ3 may be different from each other.

According to dome cover 45, when the water flowing down hydrophilicity 31 reaches medium hydrophilicity 47 of the lowermost part, water is likely to move to lowermost point 33 as compared with a case where water repellent 29 is provided. In addition, the water which reaches hydrophilic circle 43 is likely to be disconnected to hydrophilicity 31 by medium hydrophilicity 47. With this, the water which reaches lowermost point 33 is difficult to support its own weight in the inside of medium hydrophilicity 47 as compared with water on other cover outer surfaces, and thus is likely to drop down.

Fifth Exemplary Embodiment

Figure 9:
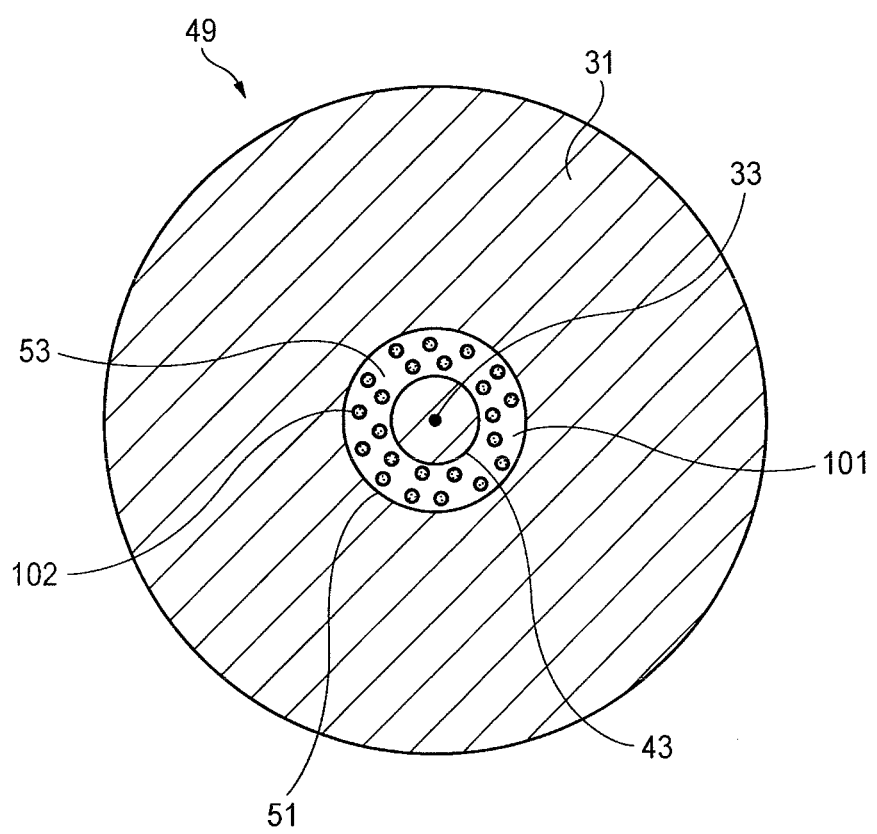
FIG. 9 is a bottom view of a dome cover according to a fifth exemplary embodiment as seen from below.

FIG. 9 is a bottom view of dome cover 49 according to a fifth exemplary embodiment as seen from below. Note that, in the fifth exemplary embodiment, the description for the same matters as those in the first to fourth exemplary embodiments will be omitted or will be simplified.

In dome cover 49, water repellent 51 includes hydrophilic circle 43 and dotted water repellent 53. Dotted water repellent 53 includes a plurality of dots (narrow regions) having the water repellent properties in the region having the hydrophilic properties. That is, the hydrophilic properties and the water repellent properties coexist in dotted water repellent 53.

On the outer periphery of hydrophilic circle 43, dotted water repellent 53 is provided in an annular shape, for example. Dotted water repellent 53 comes in contact with hydrophilic circle 43 in the inside thereof so as to surround hydrophilic circle 43. Further, dotted water repellent 53 comes in contact with hydrophilicity 31 in the outside thereof so as to be surrounded by hydrophilicity 31. Hydrophilic circle 43 is an example of a fifth hydrophilic region. Dotted water repellent 53 is an example of a dotted water repellent region.

Here, the contact angle of water in hydrophilicity 31 becomes contact angle θ4. The contact angle of water in hydrophilic circle 43 becomes contact angle θ5. The contact angle of water in dotted water repellent 53 becomes contact angle θ6. Note that, a relation expressed by contact angle θ4<contact angle θ6, contact angle θ5<contact angle θ6 is established. Contact angle θ4 and contact angle θ5 may be different from each other. Dotted water repellent 53 can be further divided into hydrophilicity 101 having contact angle θ7 and water repellent 102 having contact angle θ8. Since water repellent 102 has a very small area, dotted water repellent 53 has contact angle θ6 from a point of macro view. At this time, contact angles θ6, θ7, and θ8 satisfy the relation expressed by θ7<θ6<θ8.

Regarding the relation of contact angles θ4, θ5, θ7, and θ8, the following four patterns (1) to (4) are considered, and any one is applicable.

$$\theta 4 = \theta 5 = \theta 7 < \theta 8 \tag{1}$$

$$\theta 4 = \theta 7 < \theta 8, \theta 5 < \theta 8 \tag{2}$$

$$\theta 4 < \theta 8, \theta 5 = \theta 7 < \theta 8 \tag{3}$$

$$\theta 4 < \theta 8, \theta 5 < \theta 8, \theta 7 < \theta 8 \tag{4}$$

Among the above patters (1) to (4), in a case where dome cover 49 is manufactured by satisfying the relation expressed by the pattern (1), for example, a hydrophilic treatment is performed on the entire surface of dome cover 49 by using a hydrophilic material of contact angle θ4 (=θ5=θ7), and then the water repellent material having contact angle θ8 is transferred to the region of dotted water repellent 53. With this, it is possible to more easily and efficiently manufacture dome cover 49.

According to dome cover 49, water repellent 51 includes dotted water repellent 53, and thus it is possible to adjust the resistance in water flowing down to water repellent 51. The degree of the water repellent properties in dotted water repellent 53 is adjusted depending on, for example, the mixing rate of the dots having the water repellent properties in the hydrophilic region included in dotted water repellent 53.

That is, dotted water repellent 53 can make water to easily flow down to lowermost point 33, and can make water to easily drop down at lowermost point 33. For example, when a common hydrophilic treatment is performed with respect to the region having the hydrophilic properties which is included dotted water repellent 53 and hydrophilicity 31, it is possible to remove a clear boundary between dotted water repellent 53 and hydrophilicity 31. With this, an effect of preventing water droplet W from being formed into a convex lens shape is obtained.

Sixth Exemplary Embodiment

Figure 10:
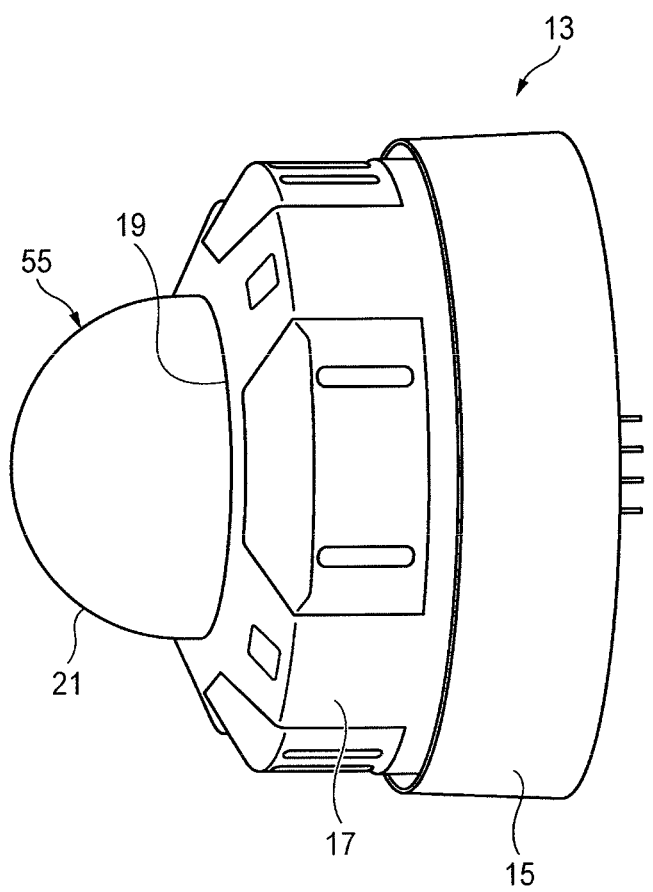
FIG. 10 is a perspective view of a monitoring camera provided with a dome cover according to a sixth exemplary embodiment in a state of being installed on a wall.
Figure 11:
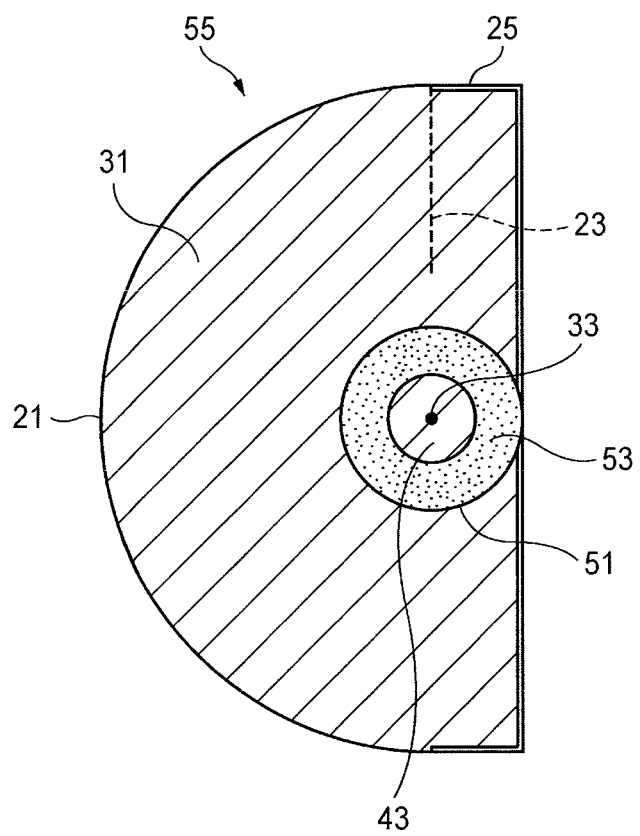
FIG. 11 is a bottom view of a dome cover according to the sixth exemplary embodiment as seen from below.

FIG. 10 is a perspective view of monitoring camera 13 provided with dome cover 55 according to a sixth exemplary embodiment in a state of being installed on a wall. FIG. 11 is a bottom view of dome cover 55 as seen from below. Note that, in the sixth exemplary embodiment, the description for the same matters as those in the first to fifth exemplary embodiments will be omitted or will be simplified.

Dome cover 55 is mounted in the direction in which monitoring camera 13 is installed on the wall surface. That is, the diametrical direction of hemisphere shell 21 is along the vertical direction. In dome cover 55, lowermost point 33 is present in the lowermost part of opening peripheral edge 23 in hemisphere shell 21. Water repellent 51 is provided at a predetermined radius around the lowermost part.

Water repellent 51 has the same configuration as that of dome cover 49. That is, water repellent 51 includes hydrophilic circle 43 and dotted water repellent 53. Hydrophilicity 31 is provided on the cover outer surface other than at water repellent 51.

Figure 12:
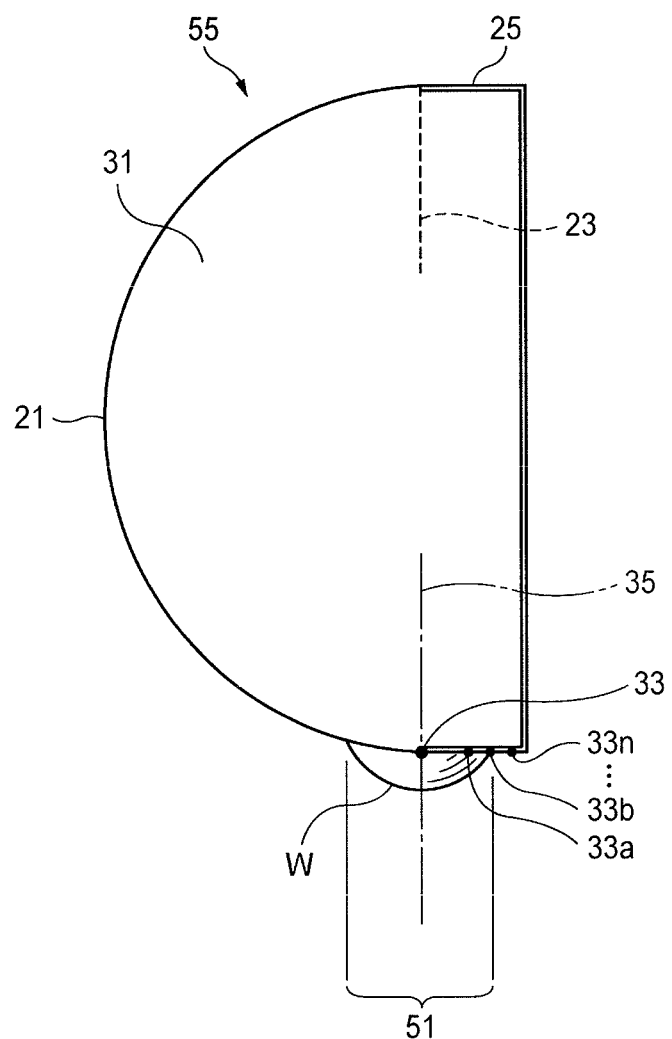
FIG. 12 is a side view of the dome cover illustrated in FIG. 10 to which the water droplet is adhered.
Figure 13:
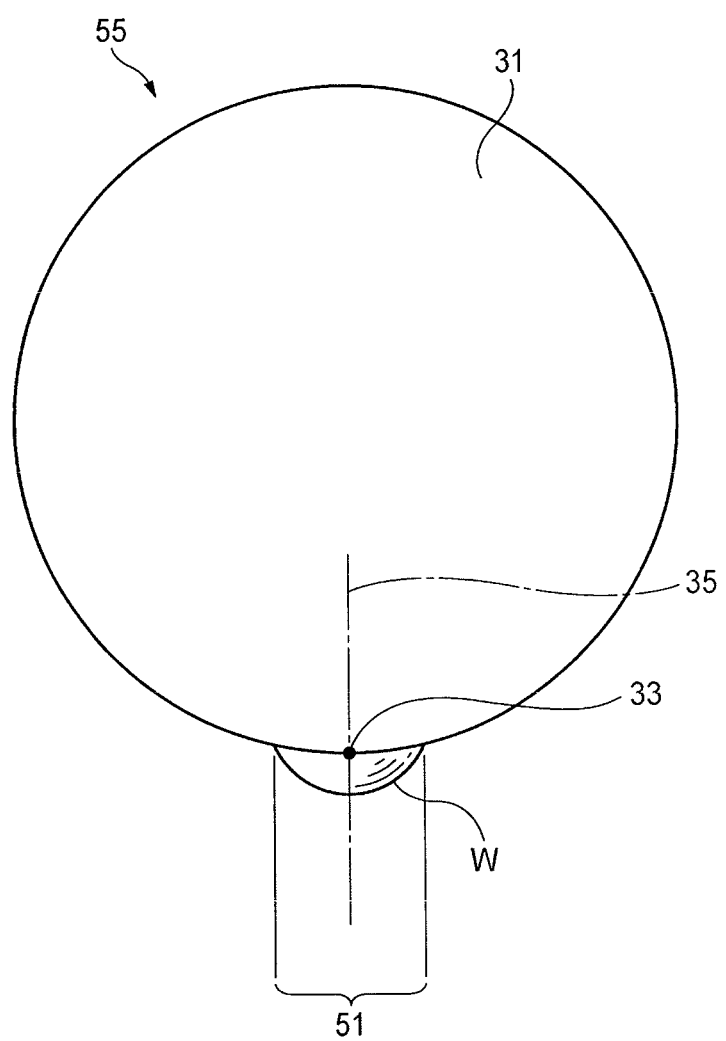
FIG. 13 is a front view of the dome cover illustrated in FIG. 10 to which the water droplet is adhered.
Figure 14:
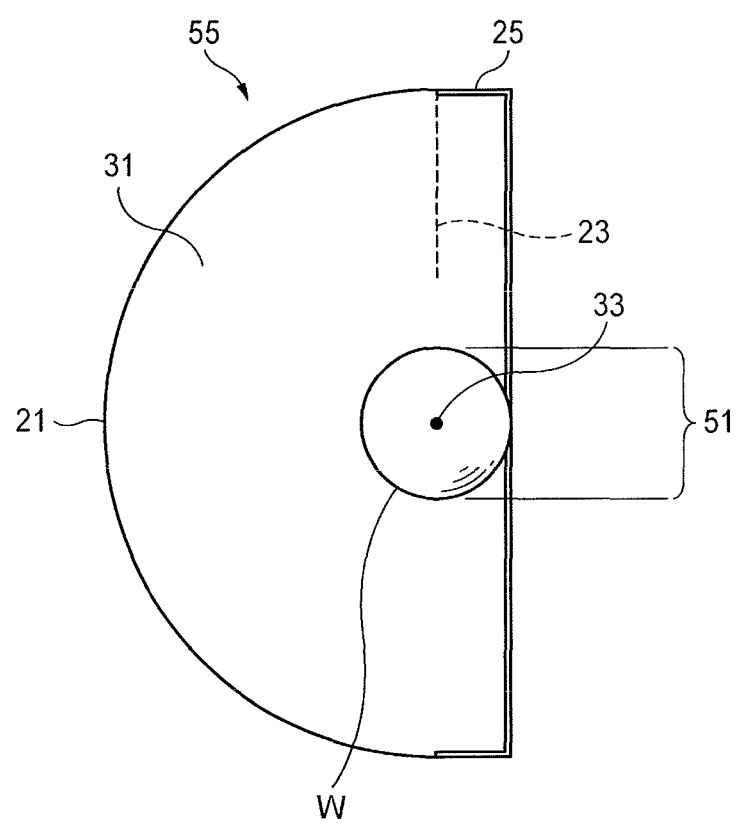
FIG. 14 is a bottom view of the dome cover illustrated in FIG. 10, to which the water droplet is adhered, as seen from below.

FIG. 12 is a side view of dome cover 55 illustrated in FIG. 10 to which water droplet W is adhered. FIG. 13 is a front view of dome cover 55 illustrated in FIG. 10 to which water droplet W is adhered. FIG. 14 is a bottom view of dome cover 55 illustrated in FIG. 10, to which water droplet W is adhered, as seen from below.

In dome cover 55, lowermost point 33 is present in the lowermost part of opening peripheral edge 23 in hemisphere shell 21 when monitoring camera 13 is installed on the wall surface. The water flowing down to the lowermost part is prompted to drop down.

According to dome cover 55, water repellent 51 includes dotted water repellent 53 in which the hydrophilic properties and the water repellent properties coexist, and thus it is possible to adjust the resistance in water flowing down to water repellent 51. The degree of the water repellent properties in dotted water repellent 53 is adjusted depending on, for example, the mixing rate of the dots having the water repellent properties in the hydrophilic region included in dotted water repellent 53.

That is, dotted water repellent 53 can make water to easily flow down to lowermost point 33, and can make water to be repelled and easily drop down at lowermost point 33. For example, when a common hydrophilic treatment is performed with respect to the region having the hydrophilic properties which is included dotted water repellent 53 and hydrophilicity 31, it is possible to remove a clear boundary between dotted water repellent 53 and hydrophilicity 31. With this, an effect of preventing water droplet W from being formed into a convex lens shape is obtained.

Note that, in a case where monitoring camera 13 is installed on the wall surface, a plurality of lowermost points 33, 33a, 33b, . . . , and 33n (refer to FIG. 12) can be linearly present cylinder 25 of dome cover 55 in a state of being connected to lowermost point 33 of opening peripheral edge 23. In this case, water repellent 51 may be provided around a certain lowermost point which is obtained by considering a mounting inclination angle of monitoring camera 13 with respect to the wall surface and a taper of cylinder 25.

Therefore, in accordance with dome cover 11, 37, 41, 45, 49, and 55 according to the respective exemplary embodiments, it is difficult to maintain a state where water droplet W is adhered to the lowermost part of the cover outer surface having the convex curved surface which is downwardly projected in the vertical direction. Accordingly, it is possible to prevent the image quality of the captured image from being deteriorated caused by the water droplet even in the case where monitoring camera 13 captures an image in a vertically downward direction.

Further, it is possible to adjust the water repellent properties and the hydrophilic properties in the lowermost parts of dome cover 11, 37, 41, 45, 49, and 55 by configurations around the lowermost part in the respective exemplary embodiments. Thus, it is possible to adjust the size of the water droplets gathered in the lowermost part, and thus the water droplets are likely to drop down by the gravity with the configuration of the lowermost part of any dome cover in the above-described exemplary embodiments.

Other Exemplary Embodiments

As described above, the first to sixth exemplary embodiments are described as examples of the technique in the present disclosure. However, the technique in the present disclosure, is not limited thereto, but can be applied to other exemplary embodiments in which modification, substitution, addition, omission, and the like are performed. The respective exemplary embodiments may be combined with each other.

In the first to sixth exemplary embodiments, monitoring camera 13 is exemplified as a capturing device; however, a capturing device (for example, a car-mounted camera) other than monitoring camera 13 may be employed.

In the first to sixth exemplary embodiments, a dome cover is exemplified as a camera cover; however, a camera cover other than the dome cover may be employed.

In the sixth exemplary embodiment, a case where monitoring camera 13 including the dome cover which is described in the fifth exemplary embodiment is installed on the wall surface is exemplified; however, monitoring camera 13 including the dome covers described in other exemplary embodiments (any one of the first to fourth exemplary embodiments) may be installed on the wall surface.

For example, in a case where a monitoring camera is installed by being inclined by 45 degrees, or a case of a monitoring camera to which the dome cover is mounted by being inclined by 45 degrees in the first place, if the water repellent region is formed in the lowermost part of the dome in vertical direction, that is, in the vicinity of the position at 45 degrees from a top portion, the same effects can be obtained.

What is claimed is:

1. A camera cover comprising:
   a cover outer surface which is a convex curved surface having a lowermost part in a vertical direction that downwardly projects in the vertical direction;
   a first region which is defined to be within a periphery defined by a predetermined radius around a substantially lowermost point of the convex curved surface; and
   a second region which is provided on the cover outer surface other than within the first region,
   wherein the second region includes a first hydrophilic region having a first hydrophilic property, and
   wherein the first region has lower a second hydrophilic property lower than the first hydrophilic property of the second region.

2. The camera cover of claim 1,
   wherein the first region includes a water repellent region.

3. The camera cover of claim 2,
   wherein the first region further includes a guide path extending from the second region toward the substantially lowermost point, and
   wherein the guide path has a third hydrophilic property higher than a hydrophilic property of the water repellent region.

4. The camera cover of claim 3,
   wherein the first region includes a second hydrophilic region having a fourth hydrophilic property higher than the second hydrophilic property of the first region, the second hydrophilic region being substantially concentric with the first region about the substantially lowermost point, and being defined by a radius shorter than the predetermined radius of the first region.

5. The camera cover of claim 3,
   wherein the guide path comprises a plurality of guide paths radially provided around the substantially lowermost point.

6. The camera cover of claim 1,
   wherein the first region includes:
   a third hydrophilic region having a third hydrophilic property; and
   a fourth hydrophilic region which surrounds the third hydrophilic region, is surrounded by the second region, and has a fourth hydrophilic property lower than the third hydrophilic property of the third hydrophilic region.

7. The camera cover of claim 1,
   wherein the first region includes:
   a fifth hydrophilic region having a fifth hydrophilic property; and
   a sixth region which surrounds the fifth hydrophilic region, and is surrounded by the second region, the sixth region having a plurality of water repellant dots and having a sixth water hydrophilic property lower than the fifth hydrophilic property of the fifth hydrophilic region.

8. The camera cover of claim 1,
   wherein the camera cover is a dome cover including a hemisphere shell.

9. The camera cover of claim 1, wherein the entire camera cover is transparent.

* * * * *